Dec. 10, 1963 D. A. CALEY 3,113,801
FOLDING SEAT ASSEMBLY
Filed May 18, 1961

INVENTOR.
DONALD A. CALEY
BY John R. Faulkner
John J. Roethel
ATTORNEYS

United States Patent Office 3,113,801
Patented Dec. 10, 1963

3,113,801
FOLDING SEAT ASSEMBLY
Donald A. Caley, Livonia, Mich., assignor to Ford Motor Company, Dearborn, Mich., a corporation of Delaware
Filed May 18, 1961, Ser. No. 110,911
3 Claims. (Cl. 296—66)

This invention relates to a folding seat assembly for use in dual purpose motor vehicles.

The construction of certain types of motor vehicles permits rapid conversion of the vehicle to allow either a number of passengers or a considerable bulk of cargo to be carried. The station wagon is a notable example of a vehicle of this type.

The dual function of the station wagon results, at least in part, from the use of folding seat assemblies. With the exception of the front seat, the seat assemblies of wagons are constructed to permit folding from the upright passenger carrying position to a cargo carrying position. In the latter position, the seat provides an extension of the cargo carrying floor of the vehicle. The folding seat assembly currently utilized in production vehicles may take any one of several forms.

The present invention relates to a category of folding station wagon seat assemblies in which both the seat portion and the back rest portion are pivotally supported for folding action. The seat portion is pivoted forward through approximately 180 degrees into the cargo carrying position. In this latter position the underside of the seat portion forms a forward cargo carrying floor panel. The back rest portion pivots forwardly and downwardly through approximately 90 degrees from the upright position. The back side of the back rest portion provides a rearward cargo carrying floor panel.

This category of folding seat assemblies permits folding with a minimum of physical effort. Current seat assemblies embodying this construction, however, have some undesirable features. They generally require a latch mechanism to lock the seat assembly in the upright position. Folding of this type of seat assembly is generally a multistep operation requiring: (1) releasing of the latch mechanism, (2) pivoting the seat portion, and (3) pivoting the back rest portion. This type of seat assembly also requires the provision of additional support for the seat portion when it is folded into the cargo carrying position.

The present invention relates, in general, to a folding seat assembly of the last described category. The construction of the present invention, however, permits a single step folding operation. In addition it provides a much simplified and more stable construction that requires no latches.

The seat assembly of the present invention includes separate, pivotally supported seat and back rest portions. In the cargo carrying position, the reverse side of the respective cushions forms an extension of the cargo carrying floor. Linkage interconnects each of the portions for interrelated folding action whereby pivotal movement of one portion causes pivotal movement of the other portion. The linkage, through an over-center relationship, obviates the necessity of securing catch devices. A portion of the linkage further serves to provide additional support for the seat assembly in both the upright and cargo carrying positions.

Further features and advantages of this invention will become more obvious as they description proceeds particularly when considered in conjunction with the accompanying drawings, wherein.

Referring now in detail to the drawings, there is shown generally at 11 a foldable vehicular seat assembly. Seat assembly 11 includes a seat portion 12, a back rest portion 13 and linkage means coupling said portions together for folding and unfolding movements. Substantially similar linkage mean sare utilized at each side of seat assembly 11 to permit the folding action and the construction at only one side of the seat assembly will be described in detail.

Figure 2:
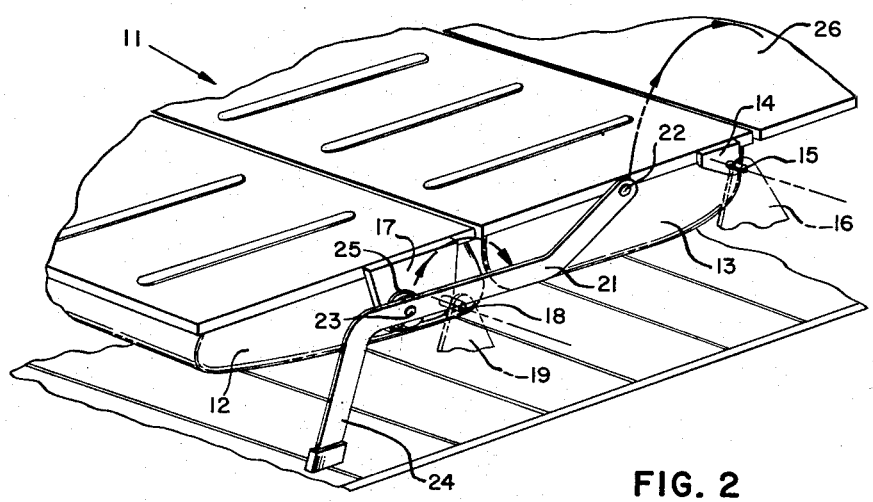
FIG. 2 is a perspective view in part similar to FIG. 1 showing the seat assembly converted to permit the carrying of cargo.
Figure 1:
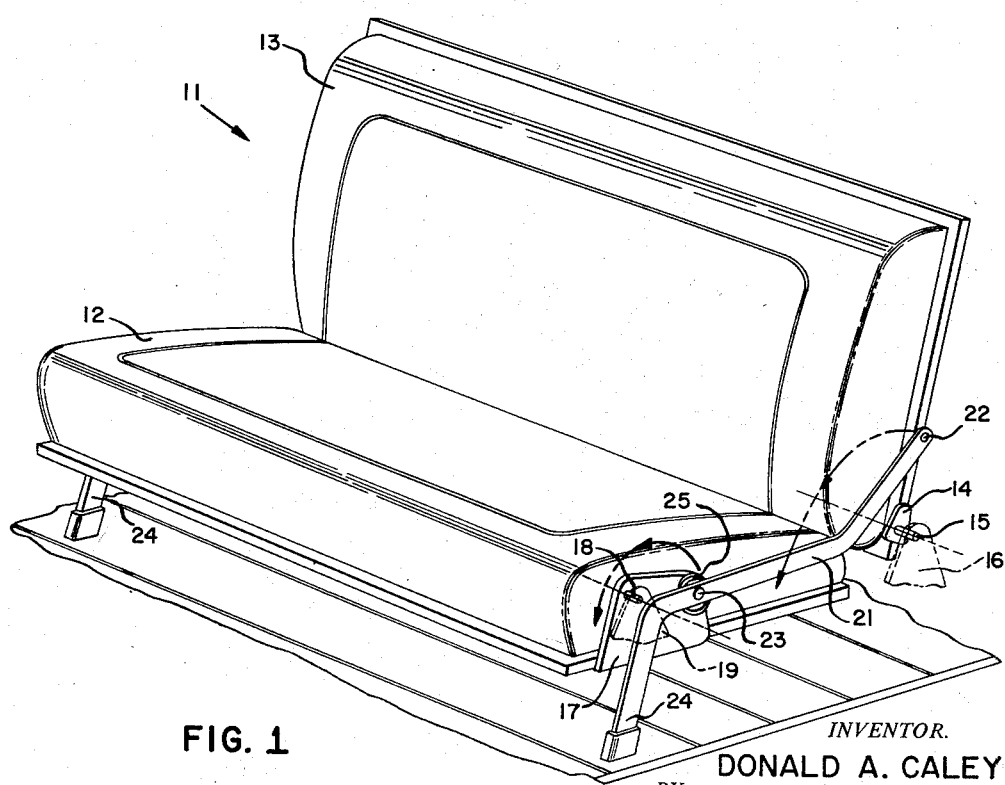
FIG. 1 is a perspective view of a seat assembly embodying the present invention showing the assembly in the upright or passenger carrying position.

A bracket 14 is secured near the lower edge of the frame of back rest portion 13. Bracket 14 supports a pivot pin 15. Pivot pin 15 is pivotally supported in a bracket 16 which is secured in any suitable manner to the vehicle body. Back rest portion 13 may pivot about the axis defined by the pivot pin 15 at each side of back rest portion 13 from the upright position (FIG. 1) to the cargo carrying position (FIG. 2).

Near the forward end of the frame of seat portion 12 a bracket 17 is secured. Bracket 17 supports a pivot pin 18. Pivot pin 18 is pivotally supported in bracket 19 which is secured in a suitable manner to the vehicle body. Seat portion 12 may pivot about the axis defined by the pivot pin 18 at each side of the seat portion from the upright position (FIG. 1) to the cargo carrying position (FIG. 2).

A link 21 is pivotally connected to seat portion 12 and back rest portion 13 to permit interrelated folding action. At its rearward end, link 21 is pivotally connected to back rest portion 13 as by a pin 22. At a forward point, link 21 is pivotally connected to seat portion 12 as by a pin 23 secured to bracket 17. At its extreme forward end, link 21 is formed with a downturned foot portion 24 which serves to provide support for seat portion 12 in a manner to be described.

It should be noted that, in the upright position (FIG. 1), pin 23 lies below a line connecting pivot pins 18 and 22. This produces an overcenter or toggle relationship between the respective pivot points resulting in an inherently stable condition for seat assembly 11 in the upright condition. This obviates the necessity of securing latch devices.

To convert seat assembly 11 for cargo carrying from the upright position, it is first necessary to raise the rear of seat portion 12 an amount sufficient to position pin 23 above the line connecting pins 18 and 22. Once this condition is reached, the overcenter relation is no longer present and further pivotal movement of either portion of the seat assembly will be transmitted into pivotal movement of the other portion by link 21. A counterbalance spring 25 is connected between bracket 17 and link 21 to assist in the folding operation.

As may be seen in FIGURE 2, the side reverse to the cushioned side of each portion of the seat assembly is constructed to form an extension floor panel. The surfaces together with the vehicular floor 26 provides an uninterrupted floor when seat assembly 11 is folded into its cargo carrying position.

Loads exerted on seat portion 12 in either position tend to cause pivotal movement of seat portion 12 about its pivotal axis. The normal loads on seat portion 12 tend to cause clockwise motion of seat portion 12 in the position shown in FIG. 1 or counterclockwise movement in the position shown in FIG. 2. This tendency is resisted by the reaction of foot portion 24 of link 21 against the vehicle floor. The loads transmitted to seat assembly 11 are transmitted by foot 24 to vehicle floor through pin 23. In the upright position (FIG. 1) pin 23 is positioned behind pin 18. In the cargo carrying position (FIG. 2), pin 23 is positioned ahead of pin 18. Pin 23 is, therefore, located in the proper position to resist pivotal loads placed on seat assembly 11 regardless of the position of the latter. This assists in maintaining the inherent stability of seat assembly 11.

It will be understood that the invention is not to be limited to the exact construction shown and described, but that various changes and modifications may be made without departing from the spirit and scope of the invention, as defined by the appended claims.

I claim:

1. A folding vehicular seat assembly comprising a seat portion having a cushioned surface and a reverse surface, a back rest portion having a cushioned surface and a reverse surface, means supporting said portions for pivotal movement from a first upright position wherein said cushioned surfaces form a complete seating surface to a second position wherein said reverse surfaces are substantially coplanar to form a cargo carrying floor, and linkage means operatively connected to said portions for transmitting pivotal movement of one of said portions into pivotal movement of the other of said portions, said linkage means including means operative to provide support for said seat assembly through contact with the vehicular floor in either of said positions.

2. A folding vehicular seat assembly comprising a seat portion, a back rest portion, means supporting said portions for pivotal movement about respective fixed pivot axes from an upright position to a cargo carrying position, and linkage means operatively connected to said portions for transmitting pivotal movement of one of said portions into pivotal movement of the other of said portions, said linkage means including means operative to provide support for said seat assembly through contact with the vehicle floor in either of said positions, the effective point of support provided by said last named means shifting from a position between the pivotal axes of said portions to a position forward of both of the pivotal axes as said assembly is folded from said upright position to said cargo carrying position.

3. A folding vehicular seat assembly comprising a seat portion having a cushioned surface and a reverse surface, a back rest portion having a cushioned surface and a reverse surface, means supporting said portions for pivotal movement about respective fixed pivot axes from a first upright position wherein said cushioned surfaces form a complete seating surface to a second position wherein said reverse surfaces are substantially coplanar to form a cargo carrying floor, and a link at each side of said seat assembly, each of said links being pivotally connected to each of said portions for transmitting pivotal movement of one of said portions into pivotal movement of the other of said portions, each of said links having a downwardly extending portion operative to provide support for said seat assembly through direct contact with the vehicular floor in either of said positions, the effective point of support provided by said links shifting from a point between said axes of said portions when said assembly is in said first position to a point forward of both of said axes when said seat assembly is in said second position.

References Cited in the file of this patent
UNITED STATES PATENTS

| | | |
|---|---|---|
| 2,152,505 | Stuart et al. | Mar. 28, 1939 |
| 2,926,950 | Hooverson | Mar. 1, 1960 |
| 2,997,335 | May | Aug. 22, 1961 |